United States Patent [19]
Qian

[11] Patent Number: 5,964,524
[45] Date of Patent: Oct. 12, 1999

[54] WORKLIGHT WITH STAND

[75] Inventor: Pei Sheng Qian, Shanghai, China

[73] Assignee: Regent Lighting Corporation, Burlington, N.C.

[21] Appl. No.: 09/056,334

[22] Filed: Apr. 7, 1998

Related U.S. Application Data

[60] Provisional application No. 60/072,163, Jan. 22, 1998.

[51] Int. Cl.[6] ............................................ F21L 15/08
[52] U.S. Cl. ..................... 362/414; 362/431; 362/413; 248/170; 248/171
[58] Field of Search ................................ 362/410, 414, 362/431, 250, 249, 413, 285, 418; 248/170, 171, 125.8, 159, 165, 125.1

[56] References Cited

U.S. PATENT DOCUMENTS

| | | |
|---|---|---|
| 1,113,264 | 10/1914 | Vanderslice . |
| 1,490,650 | 4/1924 | Wagner . |
| 1,729,395 | 2/1929 | Mandel . |
| 4,181,929 | 1/1980 | Barber et al. ............................ 362/431 |
| 4,183,579 | 1/1980 | Gonzales y. Rojas . |
| 4,220,981 | 9/1980 | Koether ................................... 362/431 |
| 4,319,311 | 3/1982 | Mitchell .................................. 362/250 |
| 4,892,279 | 1/1990 | Lafferty et al. . |
| 5,060,894 | 10/1991 | Hillinger ................................. 248/170 |
| 5,306,871 | 4/1994 | Lai ........................................ 362/250 |
| 5,518,082 | 5/1996 | Liao . |

*Primary Examiner*—Thomas M. Sember
*Attorney, Agent, or Firm*—Niro, Scavone, Haller & Niro

[57] ABSTRACT

The invention is a worklight and stand having a multi-legged support and a main pole consisting of three segments. The leg support increases the stand's overall resistance to tipping as well as increases the stand's load resistance. The worklight is adjustable, allowing for the aiming of light in multiple directions. The ability to break the main pole into three segments allows for the storage or packaging of the stand within a container of smaller dimension than necessary for a stand of only two segments.

8 Claims, 2 Drawing Sheets

WORKLIGHT WITH STAND

This application claims priority to U.S. Provisional Application Ser. No. 60/072,163, filed on Jan. 22, 1998.

BACKGROUND OF THE INVENTION

The present invention relates to a portable worklight and stand. More particularly, the worklight and stand of the present invention consists of a multi-legged support structure which serves to increase both the load resistance and tipping resistance of the stand. The worklight is mounted upon an adjustable bracket, allowing light to be directed in multiple directions. As well, the vertical pole of the stand is separable into three segments. This segmented pole allows the stand to be packaged and stored in a container of smaller dimension than a two-segmented stand. This serves to allow for a more efficient use of space in shipping and in the retail setting.

SUMMARY OF THE INVENTION

The present invention further improves the structure required to support a worklight. It increases resistance to tipping by 63% as well as increases the structure's load bearing ability by 23%. Further, it allows for the structure to be stored or packaged within a substantially smaller space when in a disassembled state.

The present invention uses a main pole consisting of three smaller segments connected together. It also uses a multi-legged support consisting of five legs which increases both the tipping resistance and the load bearing capabilities of the stand. Two halogen lights are mounted upon a crossbar which connects perpendicularly to the main pole. Brackets connecting the worklights to the crossbar are adjustable, allowing the light to be aimed in multiple directions. Since the main pole breaks down to three segments, the dimension of the container in which the stand may be stored or packaged is smaller than that required for a stand with a main pole of two segments.

DESCRIPTION OF THE PREFERRED EMBODIMENTS

Figure 1:
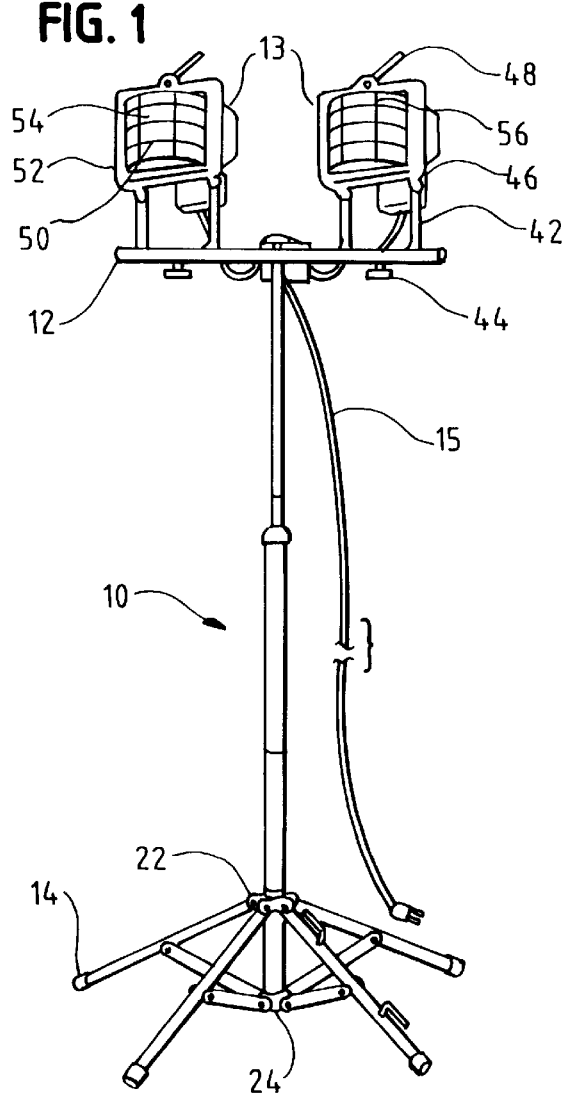
FIG. 1 is perspective view of the worklight and stand fully assembled and with the stand's legs in an extended position.
Figure 2:
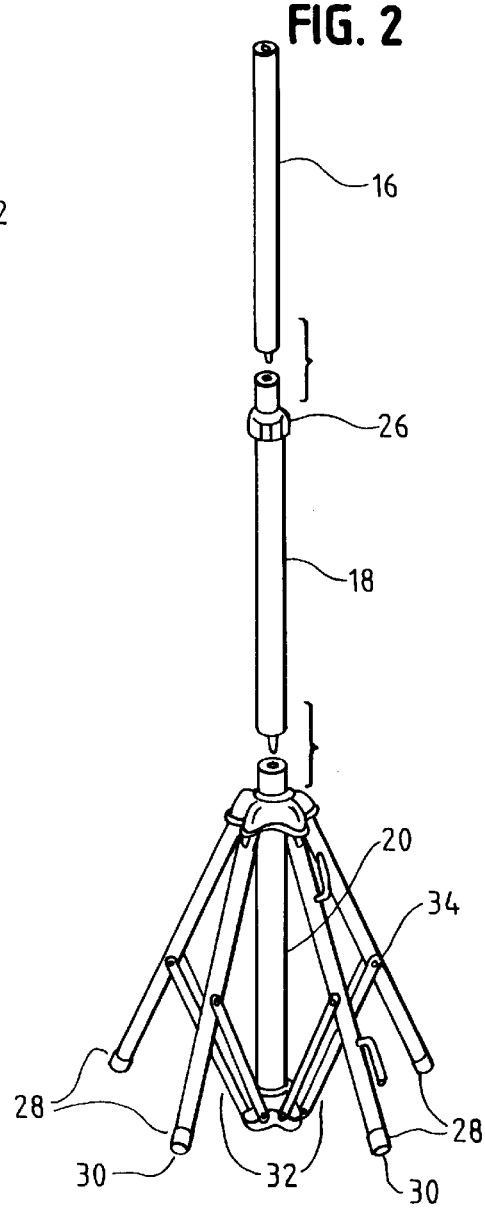
FIG. 2 is perspective view of the stand showing the segments of the vertical pole and with the stand's legs partially contracted.
Figure 3:
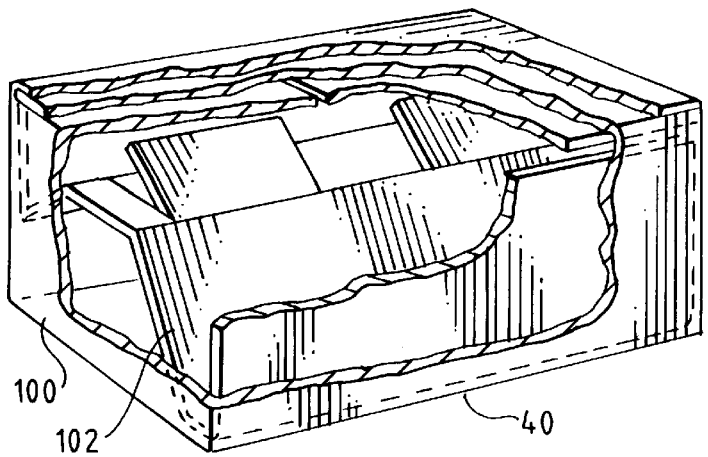
FIG. 3 is a cut-away view of a container for storing or packaging the worklight and stand.
Figure 4:
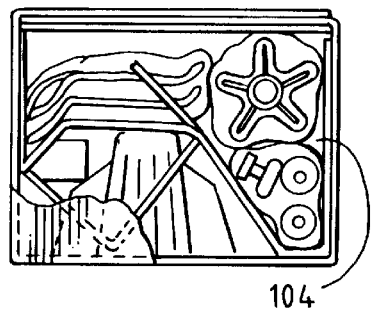
FIG. 4 is end cut-away view of the container for storing or packaging the stand showing the stand disassembled and placed within the container.
Figure 5:
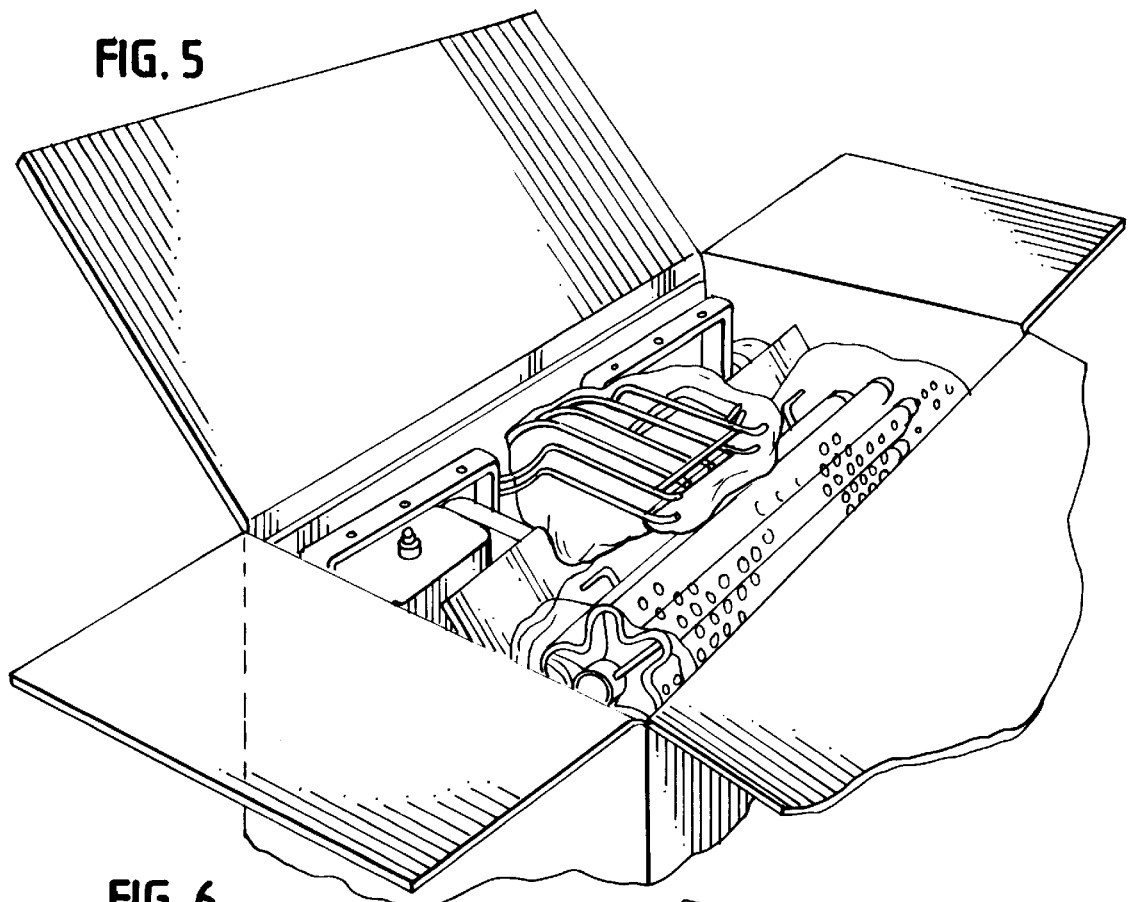
FIG. 5 is a cut-away view from a bottom perspective of the container for storing or packaging the stand showing the stand disassembled and placed within the container.
Figure 6:
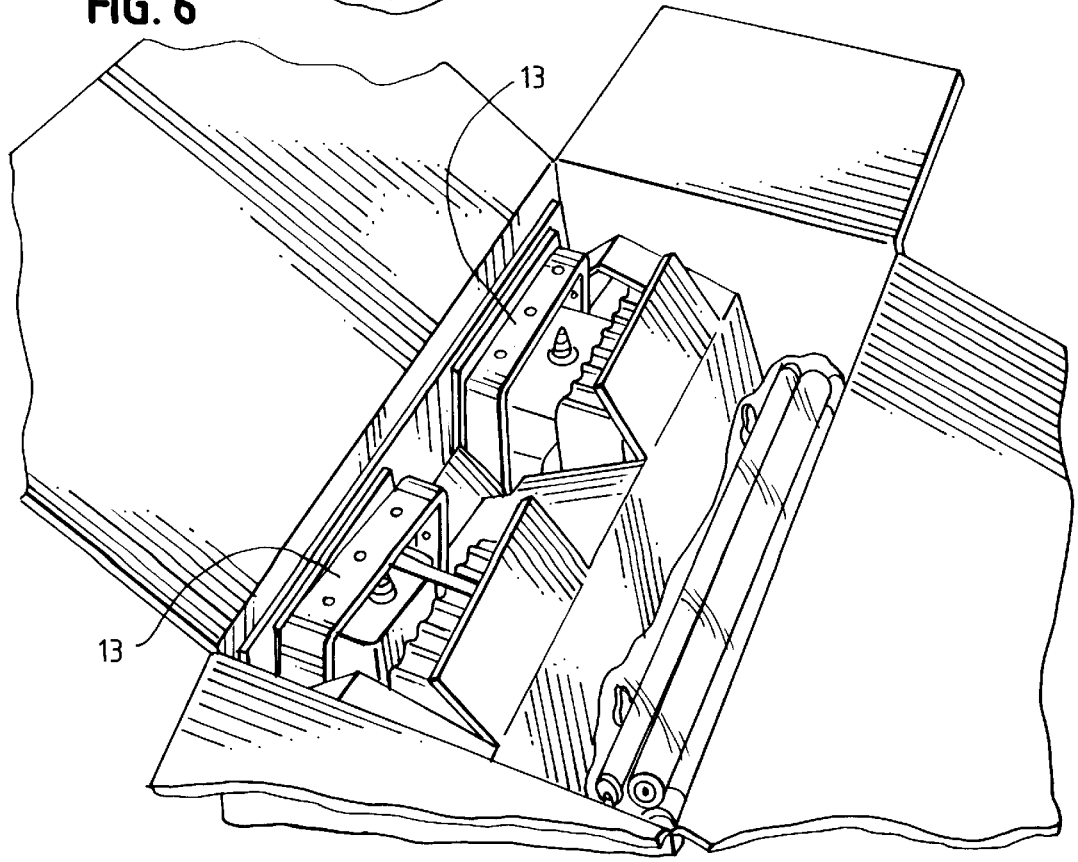
FIG. 6 is a cut-away view from a top perspective of the container for storing or packaging the stand showing the stand disassembled and placed within the container.

FIG. 1 shows the worklight and stand in its fully assembled state. FIG. 2 shows the worklight and stand in a disassembled state. The preferred embodiment contains a vertical main pole 10 formed of either metal or plastic. Main pole 10 is connected to a cross bar 12 by screw-knob 11, and a multi-legged support 14. Two worklights 13 are mounted onto cross bar 12, and power cord 15 connects to each worklight 13. Main pole 10 consists of upper segment 16, middle segment 18, and lower segment 20. Two collars 22 and 24 are mounted onto lower segment 20. A gripping handle 26 is mounted onto middle segment 18.

In the preferred embodiment, support 14 consists of five legs 28. Each leg 28 is of equal length and connected at one end to collar 22, while the other end is covered by protective cap 30. One end each of five rods 32 are secured to the mid-point of legs 28 by fasteners 34. The opposing end of each rod 32 is secured to collar 24. Fasteners 34 do not rigidly lock each rod 32 into place, but allow for the movement of rods 32, legs 28, and collar 22 in combination.

In the preferred embodiment, each worklight 13 is connected to cross bar 12 by an adjustable bracket 42. Bracket 42 mounts onto cross bar 12 by adjustable screw 44. Bracket 42 connects with each worklight 13 by adjustable screw 46. Handle 48 is located on top of each worklight 13 and in conjunction with adjustable screw 46 allows the aiming of the light in multiple directions. Worklight 13 comprises a bulb 50 surrounded by a heat resistive protective casing 52. A tempered glass lens 54 with safety wire guards 56 is mounted within casing 52.

In use, the five legs 28 of the preferred embodiment of support 14 of the worklight and stand increases the stand's resistance to tipping by 63%. The use of five legs 28 also increases the worklight and stand's load bearing capability by 25%.

In the preferred embodiment, the disassembled stand fits within container 40, a container with dimensions smaller than those for a corresponding container to store a stand comprising a two segmented main pole. Reducing the size of the container is accomplished by first using three segments 16, 18 and 20 to form main pole 10. It has been found that as the number of segments is increased, the length of the container used to store the light is decreased as well. Reducing the length of the container is important since it reduces the space needed to store the light for the end-user and it also reduces the retail space needed to display the product in a retail setting.

As shown in FIGS. 3–6, the device is stored in a compact container 100 by placing the lights in one section of the box and dividing the lights from the poles 104 from the lights by a diagonally directed divider 102. Arranging the product in this manner greatly reduces the size of the container needed to house the product.

While the main pole 10 and mounted collars 22 and 24 are generally rounded in shape, it should be noted that pole 10 and collars 22 and 24 could also be formed rectangular or square in shape. It should be understood that various changes and modifications to the preferred embodiment described would be apparent to those skilled in the art. Changes and modifications can be made without departing from the spirit and scope of the present invention and without diminishing its intended advantages. It is, therefore, intended that such changes and modifications be covered by the following claims.

What is claimed is:

1. A worklight positionable on a support surface comprising
    a stand and at least one light mounted on said stand;
    said stand comprised of at least three releasably engageable segments which join together to form a main pole having a first end section and an opposingly located second end section;

said light mounted to said first end section and a support base attached to said second end section; and said support base attached to said second end section of said main pole, said support base comprised of at least five equally spaced legs which extend downwardly from said main pole to support said worklight on a said support surface.

2. The device of claim 1 wherein said support base is further comprises:

a first collar, slidably mounted upon said main pole, said legs connected to said slidably mounted collar, and a a second collar fixably mounted on said main pole below said first collar having moveable rods connected between each of said legs and said fixed collar by fasteners, said rods allowing said legs to remain connected to said fixed collar when said sliding collar is in motion.

3. The worklight of claim 1 wherein said light is mounted either upon a crossbar perpendicular to said main pole, or directly upon said main pole of said stand, by an adjustable bracket.

4. The cross bar of claim 3 mounted perpendicularly onto said main pole of said stand by a screw knob located at the midpoint of said cross bar.

5. The adjustable bracket of claim 3 wherein said adjustable bracket facilitates the aiming of the light from said worklight in multiple directions.

6. The worklight of claim 3 wherein said worklight comprises:

a halogen bulb;

said halogen bulb surrounded by a heat resistive protective casing;

a tempered glass lens mounted within said casing;

safety wire guards mounted over said glass lens;

a power cord; and a handle.

7. The worklight of claim 6 wherein said handle mounted upon said worklight assists in the aiming of light from said worklight in multiple directions.

8. The worklight and stand of claim 1 which, when in a disassembled state, may be stored or packaged within a container of smaller dimension than a container to store a stand with a two segmented main pole.

* * * * *